UNITED STATES PATENT OFFICE.

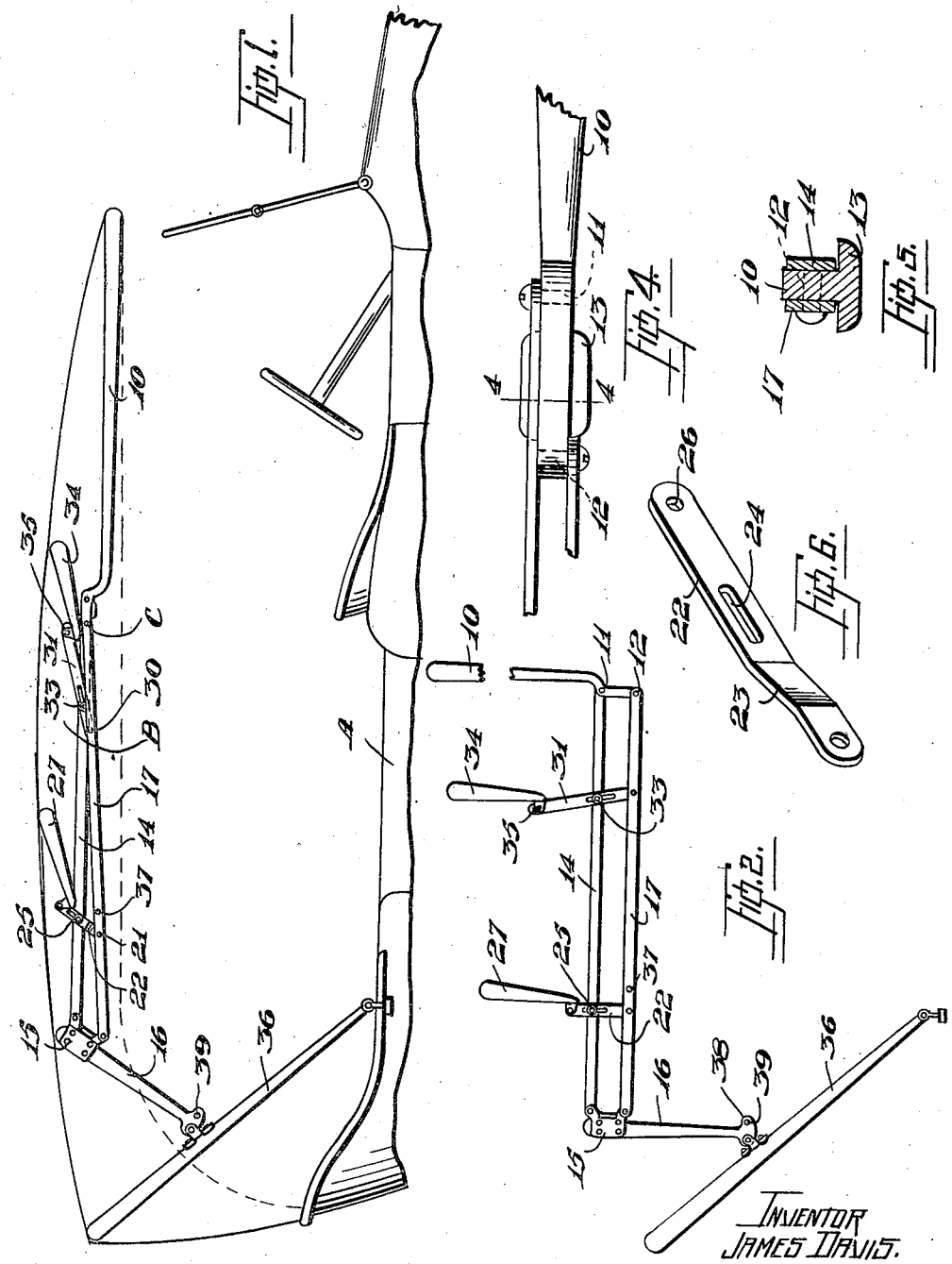

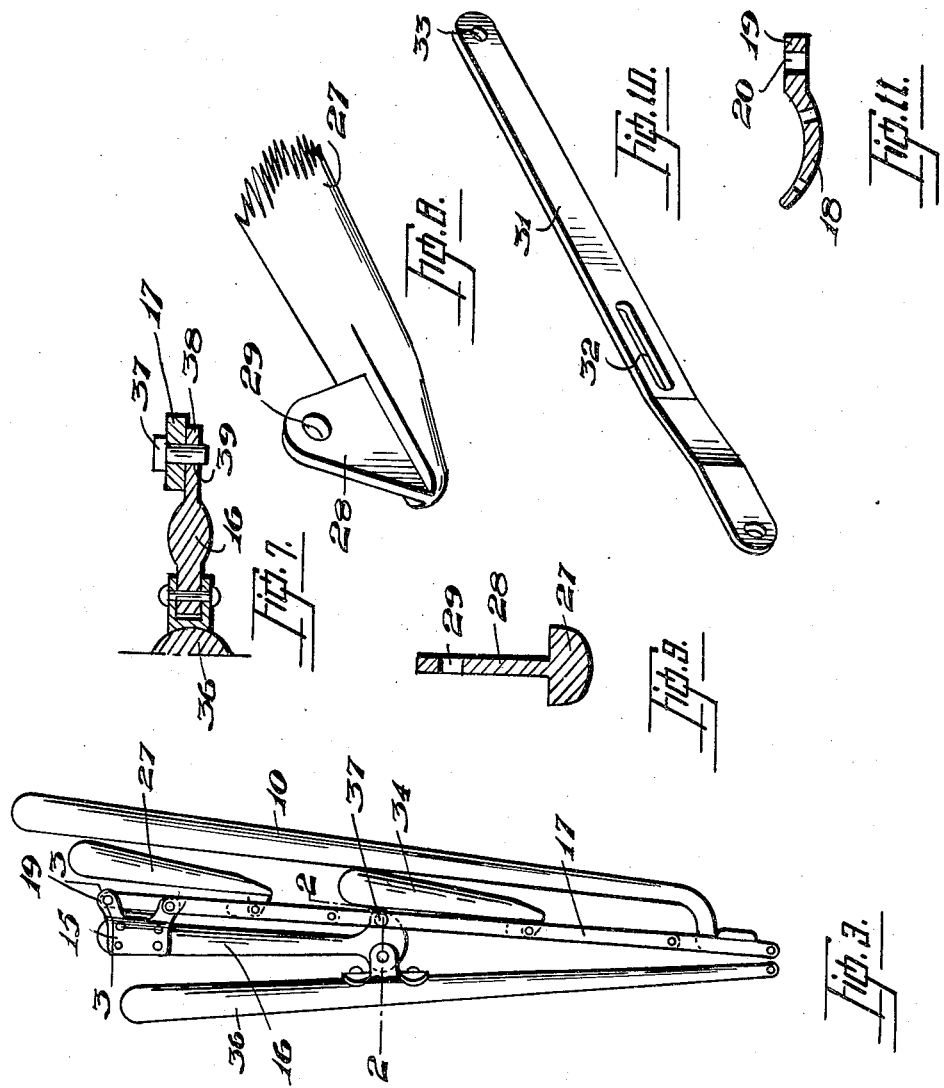

JAMES DAVIS, OF GANANOQUE, ONTARIO, CANADA.

ONE-MAN AUTOMOBILE TOP.

1,423,916.  Specification of Letters Patent.  Patented July 25, 1922.

Application filed April 18, 1921. Serial No. 462,293.

*To all whom it may concern:*

Be it known that I, JAMES DAVIS, a subject of the King of Great Britain, and resident of the town of Gananoque, in the Province of Ontario, Dominion of Canada, have invented certain new and useful Improvements in One-Man Automobile Tops, of which the following is a specification.

This invention relates to improvements in one man automobile tops, and the objects of the invention are to facilitate opening the top of an automobile and closing the same with a minimum of time and labour, the top being quickly and effectively positioned when given a slight pull, the construction of the top being such that the lever and bow arrangement will be powerful enough to retain the top securely in position when up, to provide means which will hold the top securely when down, to simplify the construction and arrangement of bows and levers, and generally to adapt the several parts to better perform the functions required of them.

With the above and other objects in view, the invention consists essentially of the improved construction particularly described and set forth in the following specification and accompanying drawings forming part of the same.

In the drawings;

Figure 1 is a fragmentary side elevation of an automobile showing my improved one man top thereon.

Figure 2 is a fragmentary side view of the bow and lever mechanism partly in collapsed position.

Figure 3 is a side elevation of the bows and levers in collapsed position.

Figure 4 is a detail plan view of the front bow and lever connections.

Figure 5 is a section on the line 4—4 of Figure 4.

Figure 6 is a perspective view of the shorter link used.

Figure 7 is an enlarged section on the line 2—2 of Figure 3.

Figure 8 is a fragmentary perspective view of one of the short bows.

Figure 9 is a sectional view taken through the end of one of the small bows.

Figure 10 is a perspective view of one of the longer links.

Figure 11 is a section on the line 3—3 of Figure 3.

Like characters of reference refer to like parts in the several figures.

Referring to the drawings, A represents an automobile of any usual description and B the cover, and C the bow and lever mechanism which supports the cover and forms the subject matter of the present invention.

The mechanism C comprises a front bow 10 having an offset end provided with a pair of orifices 11 and 12 therethrough, and a flange 13 extending laterally on both sides of the pivotal end of the said bow.

The bow 10 is pivoted to the lever 14 by a pin passing through the orifice 11 and the other end of this lever is attached to a bracket 15 carried by a short bow 16.

A second lever 17 is connected to one end of the bracket 15 and is pivoted at the other end to the front bow 10 by a pin passing through the orifice 12.

The bracket 15 is formed of two portions 18 formed with lugs 19 having orifices 20, which are engaged by pins engaging the ends of the levers 14 and 17.

The two portions 18 of the bracket 15 are fastened to the bow 16 and prevent the bow from opening up at the joint when the top maker drives in the wooden bow.

The lever 17 is provided at approximately one-third of its length with a pin 21 carrying a short link 22 offset at 23 as shown in Figure 6, and having an elongated slot 24 designed to engage a pin 25 carried by the lever 14. The free end of the link 22 is provided with an orifice 26 receiving a pin carrying a short bow 27.

The bow 27 is provided with a tapering end as shown in Figure 8 and has a lug 28 having an orifice 29 which registers with the orifice 26 of the outer end of the link 24 and the said orifices are engaged by a pin so as to connect the bow and link.

The lever 17 is provided at approximately two-thirds of its length with a second pin 30 engaging a longer link 31 having an elongated slot 32 designed to engage a pin 33 also carried by the lever 14 and the outer end of the said link is provided with an orifice 33.

A second short bow 34 similar to the bow 27 and having a tapering end provided with a lug 35 having an orifice which registers with the orifice 33 of the link 31 and the said orifices are engaged by a pin which keeps the bow 34 and the link 31 in pivotal engagement.

A back bow 36 is pivotally attached to the automobile and the short bow 16 is pivotally connected to the bow 36 intermediate of the length thereof, and in the bows 36, 16, 27, 34 and 10, the top maker drives his wooden bows which are then attached to the cover B.

It will be understood that each side of the cover B is supported by bow and lever mechanism of a type above described and when it is found necessary to lower the top, then the driver or chauffeur or other person may grip the front bow 10 and pulling rearwardly and downwardly the links 31 and 32 will be brought to an erect position as shown in Figure 2, when the pins 25 and 33 sliding in the elongated slots 24 and 32 of the links will allow of the lever 14 taking the position parallel to lever 17 as shown in Figure 2, thus raising the bow 10 in an upward position.

The top is then lowered and the bows and levers take the position illustrated in Figure 3, when the bow 10 is approximately parallel to the lever 17, the said lever 17 is provided adjacent to the pin 21 with a locking pin 37, while the bow 16 is provided at its point of pivotal engagement with the back bow 36 with a lug extension 38 having orifices 39 which when the bows and levers are in collapsed position registers with the pin 37 when the said pin 37 will spring into the orifice 39 and the bows and levers will be locked in collapsed position.

When the top is to be used, the lever 17 is forced slightly to the side so as to disengage the locking pin 37 from the orifice 39 so that the top may easily be raised and brought in the upward position with minimum effort.

The object in providing the flange 13 on the bow 10 is to provide an adequate support between the said bow and the lever 14 when the cover is open and also to provide an abutment between the bow 10 and the lever 17 when the cover is closed.

It will be seen that by this bow and lever mechanism one man can easily handle the automobile top, which can be raised or lowered with minimum labour and effort.

As many changes could be made in the above construction, and many apparently widely different embodiments of my invention, within the scope of the claims, constructed without departing from the spirit or scope thereof, it is intended that all matter contained in accompanying specification and drawings shall be interpreted as illustrative and not in a limiting sense.

What I claim as my invention is:

1. The combination with an automobile cover, of a back bow pivotally mounted at the lower end to an automobile, a bow pivotally mounted on the back bow intermediate of the length thereof, and formed with an internal apertured lug, a bracket on the said bow having lugs, a front bow having its inner end formed with a flanged extension, and T-shaped in cross section, levers connecting the flanged extension of the front bow to the said bracket lug, offset links pivotally mounted on one of the levers, the said links being provided with elongated slots, pins on the other lever engaging the slots, short bows carried by the links, and a pin on one of the levers designed to engage the apertured lug on the first said bow in collapsed position of the top.

2. The combination with an automobile cover, of a back bow pivotally mounted at the lower end to an automobile, a bow pivotally mounted on the back bow intermediate of the length thereof, a bracket on the said bow having lugs, a front bow having its inner end formed with a flanged extension and T-shaped in cross section, levers connecting the flanged extension of the front bow to the said bracket lug, offset links pivotally mounted on one of the levers, the links being provided with elongated slots, pins on the other lever engaging the slots, and short bows each having a lateral flange pivotally connected to the upper end of each of the links.

3. The combination with an automobile cover, of a back bow pivotally mounted at the lower end to an automobile, a bow pivotally mounted on the back bow intermediate of the length thereof, a bracket on the said bow having lugs, a front bow having its inner end formed with a flanged extension, and T-shaped in cross section, levers connecting the flanged extension of the front bows to the said bracket lugs, offset links pivotally mounted on one of the levers, links being provided with elongated slots, pins on the other lever engaging the slots, and short bows each having a lateral flange at its lower end pivoted to the links, each of the bows being formed with a shoulder adjacent its lateral flange designed to coact with the link and limit the downward pivotal movement of the short bows.

In witness whereof I have hereunto set my hand in the presence of two witnesses.

JAMES DAVIS.

Witnesses:
  INA L. MILLER,
  F. AILEEN ROGERS.